United States Patent Office 2,811,481
Patented Oct. 29, 1957

---

2,811,481

ZINC NEOMYCIN

Francis W. Chornock, Farmersburg, Ind., assignor to Commercial Solvents Corporation, Terre Haute, Ind., a corporation of Maryland No Drawing. Application November 29, 1954, Serial No. 471,919

1 Claim. (Cl. 167—65)

My invention relates to the antibiotic neomycin and more particularly to the new compound zinc neomycin.

Neomycin, a recent addition to the list of antibiotic substances, was first reported by Waksman and Le Chevalier in March 1949 (Science, vol. 109, page 305). It is active against many gram-positive and gram-negative bacteria. Neomycin is produced by a soil organism of the Streptomyces species similar to *Streptomyces fradiae* when grown in nutrient media. The neomycin thus produced is a basic compound which is soluble in water. Because of its alkaline nature, neomycin is usually employed in the form of a mineral acid salt, such as for example, neomycin sulfate.

Neomycin in the form of its sulfate, even though it is known to be useful as an antibiotic has been found to be unstable when stored for extended periods of time. The instability referred to is manifested by a loss in the antibiotic potency of the material, such loss occurring at storage conditions ordinarily encountered except when special precautions are taken to store the material at temperatures below room temperature. Such instability as above-referred to makes it necessary to warn users of the material against possible loss in potency at the time of use.

I have now discovered a new neomycin compound which is stable over extended periods of time at the usual storage temperatures and even at elevated temperatures, which new compound is readily obtainable and possesses the therapeutic utility of ordinary neomycin or neomycin sulfate.

My new neomycin material is the compound zinc neomycin. The new compound can be prepared employing any convenient method such as by precipitation from an aqueous solution by first dissolving neomycin sulfate in water at an acid pH, adding zinc and adjusting the pH to about 8.0 to precipitate the zinc neomycin. I prefer, however, to produce zinc neomycin from an aqueous solution of neomycin sulfate by adding an aqueous solution of zinc chloride, and then raising the pH with sodium hydroxide to precipitate zinc neomycin from the resulting solution.

The following example is offered to illustrate a method for the production of zinc neomycin.

EXAMPLE I

To 500 ml. of a 10 percent aqueous solution of neomycin sulfate was added 12 ml. of a 50 percent aqueous solution of zinc chloride. The pH of the mixture was then adjusted to 8.0 with sodium hydroxide to precipitate 23 grams of zinc neomycin assaying 155 units per mg.

Zinc neomycin is a white amorphous powder which is essentially insoluble in water. As obtained by the method of Example I, my new compound has a zinc content ranging from about 7 to 10 percent, the zinc content being variable because of the fact that the purity of the neomycin starting material varies.

Parallel stability studies were conducted in order to compare the thermal stability of zinc neomycin with that of ordinary neomycin sulfate. The following table shows the results of such a test at 45° C., the neomycin materials being incorporated in a water-miscible ointment base. The original potency of the neomycin sulfate was 200 units per milligram and the original potency of the zinc neomycin was 155 units per milligram.

Table 1

[Thermal stability—45° C.]

| Storage Period, Days | Neomycin Sulfate Ointment | | Zinc Neomycin Ointment | |
|---|---|---|---|---|
| | Units/gm. | Percent Retained | Units/gm. | Percent Retained |
| 0 | 792 | 100.0 | 883 | 100.0 |
| 7 | 598 | 75.5 | 734 | 83.0 |
| 14 | 452 | 57.0 | 662 | 75.0 |
| 30 | 0 | 0.0 | 581 | 65.8 |

Zinc neomycin can be used in the treatment of diseases of the mouth and throat caused by neomycin-susceptible microorganisms. It can also be used in combination with bacitracin in the manner described in United States Patent 2,676,134.

Now having described my invention, what I claim is: Zinc neomycin.

References Cited in the file of this patent

FOREIGN PATENTS 683,632   Great Britain _____ Dec. 3, 1952

OTHER REFERENCES

Leach: "The Isolation and Characterization of Neomycin," J. A. C. S., June 1951, pp. 2797–2800, esp. p. 2800, col. 2, "Alkaline Hydrolysis of Neomycin Sulfate."

Waksman: "Neomycin," Rutgers Univ. Press, 1953, pp. 78–86.

Wybiotic, (troches containing zinc bacitracin, neomycin and polymyxin B), Unlisted Drugs, Mar. 31, 1954, p. 37.

Monash: "Use of Insoluble Penicillin Salts for the Prolongation of Penicillin Blood Levels," Sci., Oct. 17, 1947, p. 370.